Patented May 26, 1936

2,042,343

UNITED STATES PATENT OFFICE 2,042,343

BENZYL SUBSTITUTED SALICYLIC ACID AND METHOD OF MANUFACTURING THE SAME

Lucas P. Kyrides, Webster Groves, Mo., assignor to Monsanto Chemical Company, St. Louis, Mo., a corporation of Delaware No Drawing. Application May 7, 1934, Serial No. 724,461

4 Claims. (Cl. 260—64)

This invention relates to novel, substituted, salicyclic acid derivatives characterized in that a benzyl group is in the ortho position to the hydroxyl group. These products have valuable properties in the pharmaceutical and dyestuff arts.

The object of the present invention is to provide a new composition of matter, to wit: ortho benzyl salicyclic acid, which has been found to have valuable therapeutical properties and capable of being coupled with diazotized amino compounds by well known reactions to form dyestuffs of inordinate fastness and stability.

Ortho benzyl salicyclic acid may be made conveniently by carbonating the corresponding sodium phenate, preferably at a temperature of 150°–180° C.

The following example will illustrate one embodiment of my invention: ortho benzyl phenol and concentrated aqueous caustic soda in mol equivalent quantities are heated in a suitable inert, high boiling liquid such as toluol, xylenol, chlorbenzene, dichlorbenzene and the like, whereby the water is eliminated and the sodium ortho benzyl phenate in anhydrous condition is formed. In general, I prefer to employ orthodichlorbenzene for this dehydration since it has a high boiling point and the removal of the water is thereby greatly facilitated.

After all of the water is removed, carbon dioxide is bubbled through the mixture, preferably at a temperature of 150°–180° C. If this temperature cannot be attained by reason of the low boiling point of the inert liquid employed in the dehydration, pressure should be applied. When no more carbon dioxide is absorbed the mixture is cooled, the precipitate is filtered, dissolved in water, and acidified to phenolphthalein with muriatic acid. The unreacted ortho benzyl phenol is then extracted with benzene and the water solution is acidified further to Congo with additional muriatic acid, ortho benzyl salicyclic acid being precipitated thereby. The product so obtained is washed with water, dried, and, if desired, recrystallized from a suitable solvent such as benzene. The refined product will be found to have a melting point of approximately 133.5° C.

If desired, one may effect the carbonation under dry conditions, that is, in the absence of a liquid vehicle as commonly practiced in the manufacture of ordinary salicylic acid from sodium phenate under pressure.

The resulting product is a colorless crystalline material having a phenolic odor, is relatively more stable toward heat than salicylic acid, reacts with acetic anhydride to form the corresponding acetyl ester of ortho benzyl salicylic acid and in the form of an anilid may be coupled with diazotized amines to produce dyestuffs in which the coupling is para to the hydroxyl group including those of the rapidogen type well known to those skilled in the art. The acetyl ester has valuable therapeutic properties.

The acid chloride of ortho benzyl salicylic acid is formed conveniently by reacting the dry acid or a salt thereof with thionyl chloride or phosphorous trichloride. The acid chloride reacts with aniline or its derivatives, such as chloranilin, to form anilids of ortho benzyl salicylic acid.

If desired, one may produce the ortho benzyl salicylic acid from a mixture of ortho and para benzyl phenol. To this end the mixture of benzyl phenols and a mol equivalent of caustic soda are introduced into a liquid vehicle such as orthodichlorbenzene, and the water is eliminated to produce the anhydrous sodium benzyl phenates. After all of the water has been removed, the mixture is cooled and filtered, the para benzyl phenate being insoluble whereas the ortho benzyl phenate is soluble. The filtrate is then carbonated at 150°–180° C. as described hereinabove and the resulting ortho benzyl sodium salicylate is worked up in the regular manner.

The reactions involved may be represented as follows:

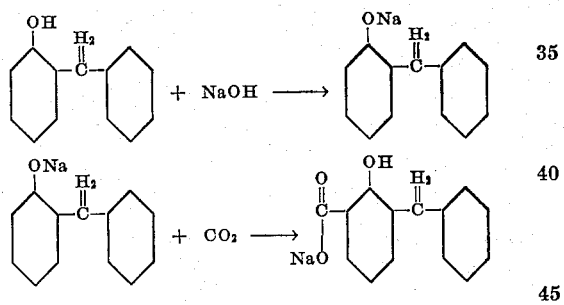

What I claim is:

1. A new chemical compound, ortho benzyl salicylic acid, being a colorless crystalline substance when pure, having a melting point of approximately 133.5° C., soluble in benzene, relatively insoluble in water, capable of combining with acetic anhydride to form the acetyl ester, and capable of coupling with amino bodies to form substances having dye properties.

2. A new chemical compound having the structural formula:

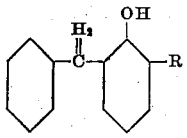

where R is one of the following groups: COOH and COCl.

3. A new chemical compound having the structural formula:

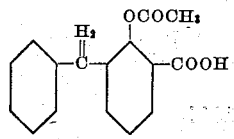

being a crystalline substance when pure having anti-pyretic properties, and being formed conveniently by causing the corresponding acid to react with acetic anhydride.

4. A new chemical compound having the structural formula:

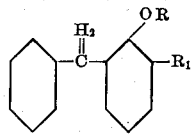

where R is a radical selected from a group consisting of hydrogen and $COCH_3$, and $R_1$ is a radical selected from a group consisting of COOH and COCl.

LUCAS P. KYRIDES.